United States Patent

Halter et al.

[11] Patent Number: 4,825,430
[45] Date of Patent: Apr. 25, 1989

[54] ERASABLE OPTICAL DATA STORAGE MEDIUM HAVING AN EMBEDDED SERVO TRACK AND A SUBSURFACE RECORDING INTERFACE

[75] Inventors: Joseph M. Halter, Beaverton; John S. Hartman; Michael A. Lind, both of Durham; W. Eugene Skiens, Wilsonville; John W. Swanson, Milwaukie; Jonathan R. Biles, Portland, all of Oreg.

[73] Assignee: Optical Data, Inc., Beaverton, Oreg.

[21] Appl. No.: 944,423

[22] Filed: Dec. 19, 1986

[51] Int. Cl.$^4$ ................................. G11B 7/24
[52] U.S. Cl. ...................... 369/275; 369/284; 369/286; 369/100; 346/135.1
[58] Field of Search ............. 369/275, 100, 284, 286, 369/288; 346/76 L, 135.1, 137; 365/126, 120, 127, 124

[56] References Cited

U.S. PATENT DOCUMENTS

| 4,264,986 | 4/1981 | Willis | 365/124 |
| 4,285,056 | 8/1981 | Bell | 346/76 L |
| 4,336,545 | 6/1982 | Howe et al. | 346/135.1 |
| 4,360,895 | 11/1982 | Cornet | 369/275 |
| 4,371,954 | 2/1983 | Cornet | 369/275 |
| 4,398,203 | 8/1983 | Cornet | 346/135.1 |
| 4,404,656 | 9/1983 | Cornet | 346/135.1 |
| 4,408,213 | 10/1983 | Bell | 365/127 |
| 4,578,788 | 3/1986 | Ahn et al. | 369/275 |
| 4,599,718 | 7/1986 | Nakagawa et al. | 369/288 |
| 4,719,615 | 1/1988 | Feyrer et al. | 369/284 |

FOREIGN PATENT DOCUMENTS

| 0136070 | 4/1985 | European Pat. Off. |
| 57-60546 | 4/1982 | Japan |

Primary Examiner—Alan Faber
Assistant Examiner—H. Nguyen
Attorney, Agent, or Firm—Chernoff, Vilhauer, McClung & Stenzel

[57] ABSTRACT

An erasable optical data storage medium has an embedded servo track and a subsurface recording interface. An erasable recording structure having two dyed polymer layers is separated from the servo track by a compression layer. The servo track is formed in a hard substrate which provides mechanical support for the medium. The medium is adapted to form non-vesicular data bumps projecting into the compression layer when exposed to a write laser beam of predetermined wavelength projected through the substrate and compression layer. The embedded servo track and recording interface are sufficiently close to each to be read simultaneously in the same focal plane.

16 Claims, 1 Drawing Sheet

ERASABLE OPTICAL DATA STORAGE MEDIUM HAVING AN EMBEDDED SERVO TRACK AND A SUBSURFACE RECORDING INTERFACE

BACKGROUND OF THE INVENTION

This invention relates to an erasable optical data storage medium having an embedded servo track, and particularly to such a medium having a subsurface recording interface including a dyed polymer material.

Many of the known optical data storage media are of the "air incident" type as exemplified by Cornet U.S. Pat. No. 4,404,656, Howe U.S. Pat. No. 4,336,545, and Bell U.S. Pat. No. 4,285,056, wherein the optically detectable mark occurs at the surface of the medium. Since scratches, dirt or the like on the recording surface of the medium would interfere with the recording and/or reading and/or erasing of data on the recording surface, one common method of protecting the recording surface of the medium is to space a hard transparent cover above the recording surface of the medium. This technique is sometimes referred to as "dust defocusing" since it serves to separate dust and dirt away from the recording surface and out of the focal plane of the operative laser beam. Not only does the resulting air space and cover increase the bulk of the resulting disk assembly, but spacing the cover precisely and evenly above the recording surface of the medium is a manufacturing problem which requires considerable care and expense.

Another method of protecting the integrity of the recording surface and providing a dust defocusing structure is to cover the recording surface with a protective layer which will not interfere with the formation of an optically detectable mark. Examples of media which employ a subsurface recording interface covered by a protective layer are shown in Cornet, U.S. Pat. Nos. 4,398,203, 4,577,291, Willis U.S. Pat. No. 4,264,986 and Japanese patent application Ser. No. 55-136253. As shown in the Japanese patent application the soft protective layer may also be covered by a hard protective layer.

In either case format data and/or tracking data can be incorporated into the storage medium or the medium assembly. The practice of recording such format and tracking data directly into the medium, although widely used, is very time-consuming. While compact discs (CD) employ hard, transparent substrates which are stamped or molded with ROM (read only memory) data, this technique is not presently appropriate for air incident, covered, writable disks because the requisite air space between the recording surface and the cover does not permit the prerecorded data on the cover to be read simultaneously in the same focal plane with the data recorded in the medium.

Applicant is aware of a medium disclosed by Ahn et al. U.S. Pat. No. 4,578,788 which addresses some of the aforementioned problems by employing a substrate including a servo track containing preformatted servo information embedded in the medium in close proximity to the data recording layer. The laser beam(s) used to "write" and "read" pass through the substrate to the data recording layer, a portion of the read beam being reflected from the embedded servo track and detected to provide servo information. Such media with embedded servo tracks are sometimes called "substrate incident" media. It should be noted that the medium disclosed by Ahn et al. is not an erasable medium—the data mark is formed by a vesicular or ablative technique which cannot be reversed to erase the data mark. It should also be noted that Ahn et al. relies upon a metal or metallic layer to write, the metallic layer absorbing light energy from the laser beam to heat an adjacent polymer layer, causing it to expand and deform the metallic layer. The metallic layer also reflects the light of the laser beam to read the data mark.

Three patent applications commonly owned by applicant's assignee disclose erasable optical data storage media adapted to write and erase air-incident, optically-detectable deformations in a non-ablative, non-vesicular manner. Like the present invention, these applications are directed toward a medium which uses dyed polymer materials to create zones or layers of differing optical and thermal-mechanical properties which may be operatively acted upon by a laser beam of a predetermined wavelength to write data in the medium and to read data in the medium, and acted upon by another laser beam of predetermined wavelength to erase data from the medium. Pursuant to MPEP 608.01(P), commonly owned U.S. patent application Ser. Nos. 835,960, 914,461 and 916,609 are incorporated herein by reference with particular attention drawn to the identification of the prior art contained therein and to the media and methods disclosed therein.

SUMMARY OF THE INVENTION

The present invention addresses the problems discussed above by providing an optical data storage medium with an embedded servo track and including a subsurface recording interface. The recording interface is spaced from the embedded servo track by a relatively thin, soft compression layer. The recording interface is defined by the compression layer and an adjacent recording structure which includes dyed polymer material.

In the preferred embodiment, the recording structure includes two layers of dyed polymer material, the retention layer and the expansion layer, which cooperate to form erasable, non-vesicular bumps projecting into the compression layer. To enhance the reflectivity of the servo track interface and the recording interface, the index of refraction of the compression layer is substantially different than the indices of the adjacent substrate and dyed polymer material of the retention layer. The recording interface is substantially non-metallic and the medium employs dyes to tune the recording structure for the desired spectral absorbtance properties and the desired reflective properties. All three layers, the compression layer, retention layer and expansion layer, are integrally bonded to each other to prevent delamination or creep.

Accordingly, it is a principal object of the present invention to provide an optical data storage medium with prerecorded servo/format information embedded in the medium and having a subsurface recording interface.

It is a related object of the present invention to provide such a medium having a recording structure of dyed polymer material which is adapted to form an erasable, non-vesicular, optically detectable deformation at the recording interface.

It is an associated object of the present invention to provide such a medium, the layers of which are integrally bonded to each other.

It is another object of the present invention to provide a medium having a recording interface which is substantially non-metallic.

It is a further object of the present invention to provide such a medium which uses dyes to tune the medium to achieve the desired spectral absorbtance and influence the spectral reflectance properties.

It is a further object of the present invention to provide such a medium which uses the relative indices of refraction and the thickness of adjacent materials to enhance the spectral reflectivity of the recording interface.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
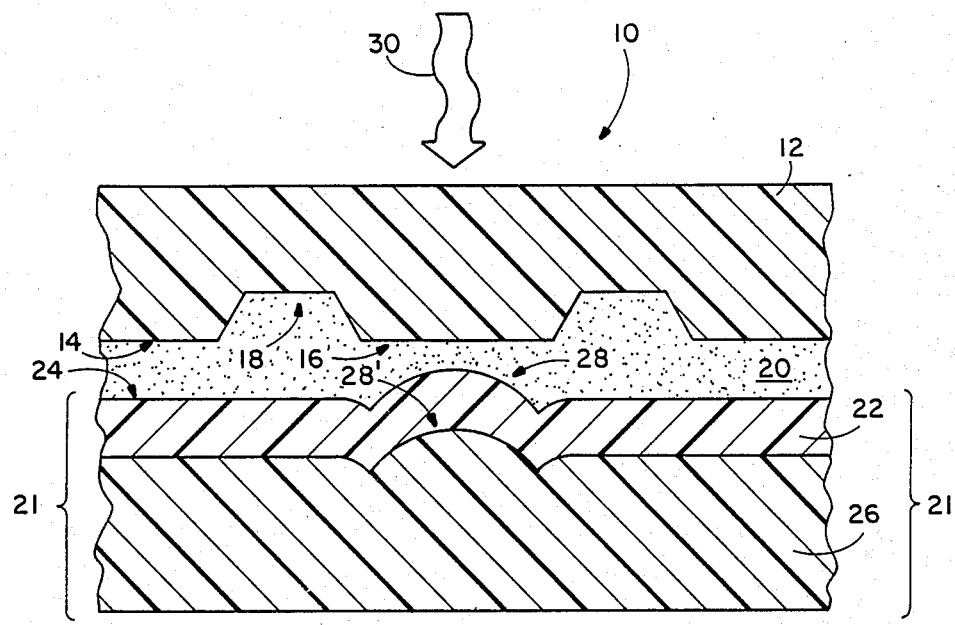
FIG. 1 is a partial sectional elevational view of an exemplary medium according to the present invention showing a bump formed beneath a land of a grooved substrate.
Figure 2:
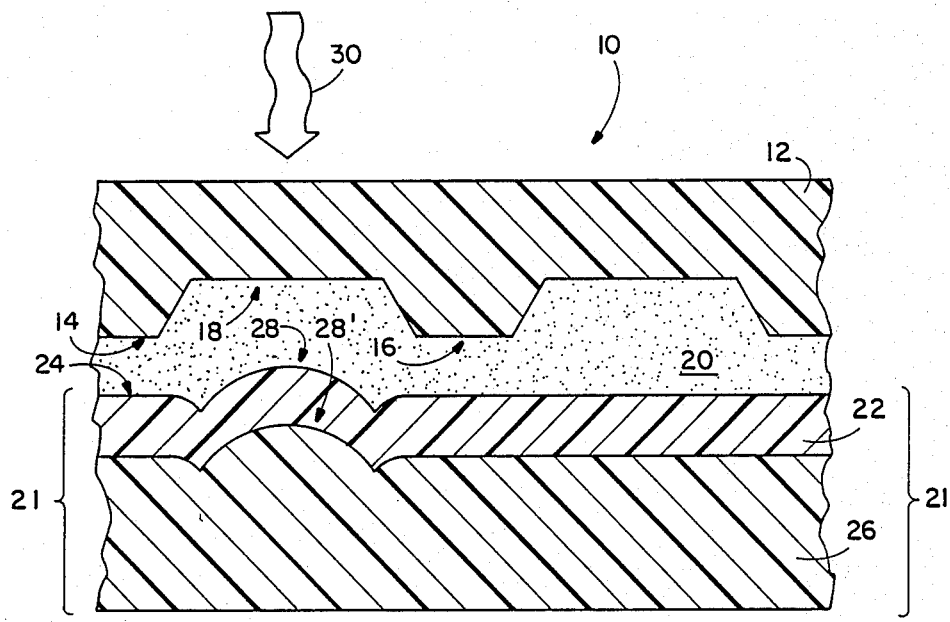
FIG. 2 is a partial sectional elevational view of an exemplary medium showing a bump formed beneath a groove of a grooved substrate.

As shown in FIGS. 1 and 2, the erasable optical data storage medium 10 of the present invention includes a transparent substrate 12 in which a servo track 14 has been formed by forming lands 16 and grooves 18 in one of the surfaces of the substrate. The servo track generally contains position information, but may also contain other pre-programmed information. The servo surface of the substrate may contain any type of preformatted servo information, or other information, including but not restricted to pregrooving.

A relatively thin compression layer 20 of clear, soft, compressible, polymer material is integrally bonded to the servo track surface of the substrate to define an undulating servo interface therewith.

Adjacent to the compression layer 20 is a recording structure 21, including a retention layer 22 and an expansion layer 26. The relatively thin retention layer 22 is of dyed polymer material and is integrally bonded to the compression layer to define a planar recording interface 24 therewith which is optically smooth prior to writing thereon. The retention layer is responsible for retaining a data mark (bump) upon deformation during the writing process.

Integrally bonded to the retention layer is the thicker expansion layer 26, also of dyed polymer material. The polymer material of the expansion layer is dyed to have different optical properties from the retention layer, and the polymer materials of the expansion layer and retention layer also have different thermal-mechanical properties. The expansion layer is responsible for expanding and deforming the retention layer when heated by a localized "write" laser beam.

Data is stored in the medium in the form of optically detectable undulations and deformations occurring at the various subsurface interfaces between the layers which make up the medium. Data stored in the medium is read by detecting and measuring variations in a "read" laser beam which is reflected from the various interfaces. Since the reflectance ("R") of an interface is directly related to the relative refractive indices of the materials comprising the interface, it is desirable to provide adjacent layers which have substantially different indices of refraction. This relationship may be expressed by the equation $R=((n_1-n_2)/(n_1+n_2))^2$ where $n_1$ and $n_2$ are the respective indices of refraction of the adjacent materials at the interface.

Bearing these principles in mind, and referring again to FIGS. 1 and 2, the undulating interface forming the servo track 14 between the substrate 12 and the compression layer 20 contains preformatted servo information stored in the medium. To enhance the readability of this information it is desirable that the material of the substrate and compression layer have substantially different indices of refraction to increase the reflectivity of this interface.

It will be noted that there are several bumps 28 shown at the recording interface 24 between the retention layer 22 and the compression layer 20. Corresponding bumps 28' occur directly below bumps 28 at the interface between the retention layer and the expansion layer 26. As will be explained further below, the bumps 28 represent information which is stored in the medium by writing with a laser beam. Therefore, it is preferable that the respective indices of refraction of the compression and retention layers also be substantially different to enhance the reflectivity of the recording interface and thereby enhance the visibility of the bumps.

One variation of the present invention also uses reflection from the bumps 28' at the interface between the retention and expansion layers to enhance and reinforce the reflection from the bumps 28 at the recording interface. It follows that in such a variation it is also desirable for the retention and expansion layer on either side of their common interface to have indices of refraction which are substantially different.

Accordingly, an exemplary medium as shown in FIGS. 1 and 2, might have a substrate with an index of refraction (hereinafter referred to merely as "index") of 1.56, a compression layer with an index of 1.41, a retention layer with an index of 1.79, and an expansion layer with an index of 1.59. While the exemplary medium is configured with a high/low/high/low index configuration, mediums configured with low/high/low/high indexes are also within the scope of the present invention.

The index of a material is largely dependent upon the nature of the material, and, in accordance with this invention, the index can be further adjusted by selectively dying the material to increase the difference in the indices of adjacent materials. As will be explained below, dyes are used not only to tune the medium for maximum reflectance at the interfaces, but also to adjust the spectral absorbtance of the materials to create the active recording structure.

The materials making up the exemplary medium of FIGS. 1 and 2 are as follows:

A rigid, clear, transparent polycarbonate substrate 12 which has been preformatted and/or pregrooved provides the primary mechanical support for the medium. This is a significant advantage over the air incident media which typically need a supporting substrate as well as a hard cover. The lands 16 and grooves 18 shown in FIGS. 1 and 2 illustrate a partial cross-section of an injection-molded polycarbonate disk with grooved tracks. Other materials which are suitable for the substrate include glass and other plastics such as polymethylmethacrylate, epoxy and other transparent polymers. Since the laser beams 30 used for writing, reading, and erasing are polarization specific and must be transmitted through the substrate, it is preferable that the substrate have a low absorbtion coefficient and low birefringence. The servo track 14 may also be embossed or stamped into the material of the substrate. As explained in the Background, using a substrate which has been preformatted and/or pregrooved provides substantial savings in time and expense.

The compression layer 20 is a clear, soft, highly elastic silicone resin such as Dow Corning Sylgard 184. As discussed below, the compression layer material must allow the bumps 28 to rise and project into the compression layer without inelastic strain of the compression layer material.

The retention layer 22 is composed of a polymerized, thermoset resin such as Dow Chemical DEN-444 epoxy. Polymerization is effected by the addition of curative(s). The resin is colored with a narrow band infra-red absorbing dye such as 1,1',3,3,3',3'-hexamethylindotricarbocyanine iodide.

The expansion layer 26 is a polyurethane material such as Morton-Thiokol Solithane 113. Polymerization is effected by the addition of curative(s). The resin is colored with a narrow band infra-red absorbing material such as 1,1,5,5-tetrakis(p-timethylaminophenyl)-2,4-pentadien-1-ol trifluoromethylsulfonate.

The properties of the expansion and retention layers as well as the important dimensional aspects of the medium will be understood in conjunction with an explanation of the methods in which data is written, read, and erased in the medium.

The basic medium and method central to this invention is fully explained in the commonly owned patent application Ser. No. 835,960 entitled "An Erasable Optical Data Storage Medium and Method and Apparatus for Recording Data on the Medium" and incorporated by reference herein. Variations on this basic medium and method are explained in commonly owned patent applications Ser. Nos. 914,461 and 916,609 respectively entitled "Medium and Method for Erasably Recording Data by Viscoelastic Shear Deformation," and "Erasable Optical Data Storage Medium Having a Zoned Integral Recording Layer," also incorporated by reference herein. These applications are all directed toward air incident media.

Broadly stated, the media and methods involve employing a recording structure having zones or layers of dyed polymer material(s) which have differing optical and thermal-mechanical properties. Referring to the exemplary embodiments of FIGS. 1 and 2, the polymer material of the retention layer 22 is dyed to absorb light in a narrow wavelength band $L_2$ and to substantially transmit light of wavelength $L_1$. The polymer material of the retention layer preferably has a glass transition temperature substantially above ambient temperature so that the material has a relatively high compressive modulus at ambient temperature.

The polymer material of the expansion layer is dyed to absorb light in a narrow wavelength band centered around $L_1$. The material of the expansion layer is typically a cross-linked elastomer such as polyurethane which has a glass transition temperature substantially at or below ambient temperature so that the material has a relatively low elastic modulus at ambient temperatures.

Upon exposure to a focused laser beam 30 of $L_1$, the retention layer substantially transmits the beam to the underlying expansion layer where most of the energy of the light is absorbed in the expansion layer material, locally heating the expansion layer and causing it to expand. The swelling of the expansion layer deforms the retention layer, pushing it into the compression layer and forming a non-vesicular, non-ablative bump 28, either viscoelastically, or elastically if the retention layer has been raised above its glass transition temperature. As the retention layer cools below its glass transition temperature, it "retains" the bump 28 as data stored in the medium. The data represented by the bump or a plurality of bumps is detected or read by interpreting variations in the reflected light from the recording interface when the medium is exposed to a focused read laser beam $L_1$ at low power.

To erase, the medium is exposed to a focused laser beam of $L_2$, the energy of which is absorbed by the retention layer, heating the retention layer above its glass transition temperature, without substantially heating the underlying expansion layer, permitting the extended expansion layer to pull the now pliable retention layer flat, erasing the data represented by the bump.

Employing this medium and method in a subsurface recording interface configuration involves further considerations. First, the material used for the compression layer must be sufficiently soft, elastic and thick so as to permit the bump 28 to rise and project into the compression layer without inelastically straining the material of the compression layer. The material of the compression layer also needs to be clear, or at least selectively dyed to substantially transmit the operative laser beams $L_1$ and $L_2$. Since the recording interface between the compression layer and the retention layer is the primary data recording interface, it is subjected to considerable stresses in the formation and erasure of bumps. Therefore, it is critical that the bond between the compression and retention layers be strong, not subject to delamination.

It is in this area that the present invention has considerable advantages over prior media which typically use a metal or metallic layer at the recording interface to absorb energy from the laser beam and to enhance the reflectivity of the interface. One of the problems with a metallic layer is that it is difficult to securely bond it to adjacent, non-metallic layers. Applicant's invention employs non-metallic, preferably polymer, materials which may be internally bonded to each other to prevent delamination or "creep" even after numerous writing and erasing operations.

As metioned above, the index of refraction of the compression layer is preferably substantially different from the index of the retention layer to enhance the reflectivity of the recording interface.

The compression layer must also be sufficiently thin so that the servo track interface and the recording interface can be viewed simultaneously within the same focal depth by a laser beam of predetermined wavelength and depth of field. This consideration is essentially at odds with the previously discussed requirement that the compression layer be sufficiently thick to permit an optically detectable bump to rise in the compression layer without inelastically straining the material of the compression layer. In the exemplary embodiment discussed herein, a compression layer which is approximately either 590 or 150 nm thick under the lands has been found to be suitable for use with a read laser beam (wavelength $L_1$) of 840 nm employed with a lens having a numerical aperture of 0.45.

It is desirable that the dimensions of the compression layer, as well as the dimensions of the retention layer, the depth of the grooves, and the height of the bump be selected so as to constructively employ the interference properties of light reflected from the medium caused by the phase shifts of the light as it passes through the various materials and crosses the various interfaces. For example, in the exemplary embodiment shown in FIG. 1, the thickness of the compression layer under a land may be arranged so that there is a phase shift of an integer number of wavelengths (in the medium). This will cause the light from a read beam passing through a land portion of the servo track interface and reflected by the servo/track interface to add to, or constructively interfere with, the light which is reflected from the recording interface directly beneath the land. The two reflected portions added together would result in a reflected light signal of maximum brightness under the land. A bump on the recording interface under a land would therefore appear as a darker point in an area of maximum brightness.

Conversely, as shown in FIG. 2 the depth of the groove in the substrate and the thickness of the compression layer under a groove might be arranged so that the reflected light from the aforementioned interfaces are phase-shifted one-half wavelength (in the medium), or odd integer multiples thereof, from each other, causing them to cancel, or destructively interfere with each other, resulting in an area of minimum brightness beneath a groove. Accordingly, a bump on the recording interface beneath a groove would appear as a brighter point in an area of minimum brightness.

At this point it should be noted that the exemplary dimensions discussed herein depend not only upon the wavelength of the operative laser beam, but also upon the precise material of the medium, the specific dyes used to color the material, and the desired contrast. This is because the wavelength of a laser beam in the medium is affected by the index of refraction of the medium. Accordingly, a change in the material or the dye which would change the index of refraction would also change the wavelength of the beam in the material and affect the optimum dimensions of the various layers.

It should also be noted that better contrast is achieved for a subsurface bump than a surface bump for the same bump height because the relative phase shift of the reflected beam caused by the bump height is amplified by the index of refraction of the overlying material.

The index configuration of the medium may also affect the dimensions of the layers since the beam undergoes an instantaneous one-half wave phase shift whenever it reflects from an interface where the incident material has a low index and the following layer has a high index. Therefore, a medium with a low/high-/low/high index configuration may be dimensioned differently than a medium with a high/low/high/low index configuration.

The preferred thickness of the retention layer is controlled by several factors. First, it must be thick enough to mechanically support the bump structure against the restoring force of the distorted compression layer and the tensile force of the stretched expansion layer. Second, it is desirable to adjust the thickness of this layer to maximize the reflectivity of its interfaces by using the aforementioned interference principles. For example, it is desirable to construct the retention layer so that the reflected light from the interface between the retention and expansion layer adds to (i.e. constructively interferes with) the reflected light from the recording interface, making the bump more visible, whether under a land or under a groove.

Although the exemplary embodiment of the invention described above has a recording structure including separate and discrete retention and expansion layers, a recording structure having zones of differing optical and thermal-mechanical properties in an integral layer of material as described in applicant's commonly owned appliation Ser. No. 916,609 is also within the scope of the invention.

In a variation of the present invention the reflectivity at the read wavelength of the various data-containing interfaces may be enhanced by the addition of an extremely thin film, less than 100 nm, of high index dye or high index dyed polymer material. The addition of this layer adds manufacturing complexity and may increase the difficulty of achieving stable adhesion of the adjacent materials at the interface but is still preferable over metal or metallic layers which present very difficult adhesion and absorption problems.

New disk structures may be available as a result of this invention. For example, a double-sided media could be built by adding the mirror image of FIG. 1 to the medium of FIG. 1. Such a double-sided disk would require only two, rather than three or four, substrate and cover elements, resulting in substantial cost and assembly advantages and providing a very compact disk assembly.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An optical data storage medium comprising:
   (a) a substrate;
   (b) a recording structure;
   (c) a compression layer intermediate said substrate and said recording structure;
   (d) said substrate and said compression layer defining a first interface, said medium including a servo track formed at said first interface;
   (e) said recording structure including a retention layer and an expansion layer integrally bonded to each other, said retention layer arranged adjacent to said compression layer defining a recording interface therewith; and
   (g) said retention layer and said expansion layer defining a second interface, the thickness of said retention layer being such that the respective reflectance from said recording interface and said second interface constructively interfere with each other for light of predetermined wavelength.

2. The medium of claim 1 wherein the index of refraction of said substrate is substantially different from the index of refraction of said compression layer.

3. The medium of claim 1 wherein said recording interface is substantially planar and sufficiently close to said first interface to be viewed simultaneously in focus therewith by a laser beam of predetermined wavelength.

4. The medium of claim 1 wherein said recording interface is substantially planar and is approximately less than 1 $\mu$m from said first interface.

5. The medium of claim 1 wherein said recording structure and said compression layer define a substantially planar recording interface, said recording structure adapted to form and retain an optically detectable deformation at said recording interface which projects into said compression layer.

6. The medium of claim 5 wherein said deformation is non-vesicular.

7. The medium of claim 1 wherein said compression layer includes polymer material.

8. The medium of claim 7 wherein said compression layer is integrally bonded to said retention layer.

9. The medium of claim 1 wherein the index of refraction of said recording structure adjacent said compression layer is substantially different from the index of refraction of said compression layer.

10. The medium of claim 1 wherein said retention layer and said expansion layer respectively include dyed polymer materials having differing optical properties.

11. The medium of claim 5 wherein said recording structure includes means for permitting said optically detectable deformation to be removed upon exposure to a focused laser beam of predetermined wavelength.

12. The medium of claim 10 said dyed polymer materials including dye means for selectively enhancing the reflectivity at said recording interface and for enhancing light energy absorption in said recording structure for light of predetermined wavelengths.

13. The medium of claim 5 wherein said retention layer is adapted to substantially transmit light of a first predetermined wavelength.

14. The medium of claim 13 wherein said retention layer is adapted to substantially absorb light of a second predetermined wavelength.

15. The medium of claim 13 wherein said expansion layer is adapted to substantially absorb light of said first predetermined wavelength.

16. An optical data storage medium comprising:
(a) a substrate;
(b) a recording structure including an expansion layer adapted to thermally expand when locally heated with light radiation of a preselected wavelength and an adjacent retention layer adapted to hold said expansion layer in stretched expanded condition upon cessation of said light radiation and cooling of said expansion layer, said expansion and retention layers defining a subsurface recording interface; and
(c) said retention layer having an index of refraction which is substantially different from the index of refraction of said expansion layer which results in a substantially reflection at said recording interface.

* * * * *

UNITED STATES PATENT AND TRADEMARK OFFICE
CERTIFICATE OF CORRECTION

PATENT NO. : 4,825,430

DATED : April 25, 1989

INVENTOR(S) : Joseph M. Halter, et al.

It is certified that error appears in the above-identified patent and that said Letters Patent is hereby corrected as shown below:

Col. 6, Line 47     Change "internally" to --integrally--

Col. 8, Line 50     After "layer" add --and--

Signed and Sealed this

Sixteenth Day of July, 1991

Attest:

HARRY F. MANBECK, JR.

Attesting Officer     Commissioner of Patents and Trademarks